(12) United States Patent
Desai

(10) Patent No.: US 6,958,685 B2
(45) Date of Patent: Oct. 25, 2005

(54) ASYNCHRONOUS LOCALIZATION SIGNALS FOR TIRE PRESSURE MONITORING SYSTEM

(75) Inventor: Tejas B. Desai, Sterling Heights, MI (US)

(73) Assignee: Siemens VDO Automotive Corporation, Auburn Hills ( * ) Notice: Subject to any disclaimer, the term of this patent is extended or adjusted under 35 U.S.C. 154(b) by 101 days.

(21) Appl. No.: 10/632,787

(22) Filed: Aug. 1, 2003

(65) Prior Publication Data

US 2005/0024192 A1 Feb. 3, 2005

(51) Int. Cl.$^7$ .............................................. B60C 23/00
(52) U.S. Cl. ...................... 340/447; 340/445; 340/448
(58) Field of Search ................................ 340/442, 444, 340/445, 446, 447; 73/146.2, 146.3, 146.4, 73/146.5; 116/34 R

(56) References Cited

U.S. PATENT DOCUMENTS

| | | | | |
|---|---|---|---|---|
| 5,880,363 A | * | 3/1999 | Meyer et al. | ............... 73/146.5 |
| 6,489,888 B1 | * | 12/2002 | Honeck et al. | ............. 340/442 |
| 6,612,165 B2 | * | 9/2003 | Juzswik et al. | ............. 73/146.5 |
| 6,771,169 B1 | * | 8/2004 | Kaminski et al. | ........... 340/442 |
| 6,784,794 B1 | * | 8/2004 | McQuade et al. | .......... 340/442 |
| 6,838,985 B2 | * | 1/2005 | Ghabra et al. | |

* cited by examiner

*Primary Examiner*—Van T. Trieu

(57) ABSTRACT

A tire pressure monitoring system includes a plurality of LF initiators for initiating a localization signal from each of the tire pressure monitoring sensors associated with each of the tires. Each of the initiators requests a signal from its respective sensors on a unique frequency. Thus, a control for the vehicle can sense the reporting frequency of the signal from each of the sensors and associate the signal with a particular location on the vehicle based upon this frequency.

6 Claims, 1 Drawing Sheet

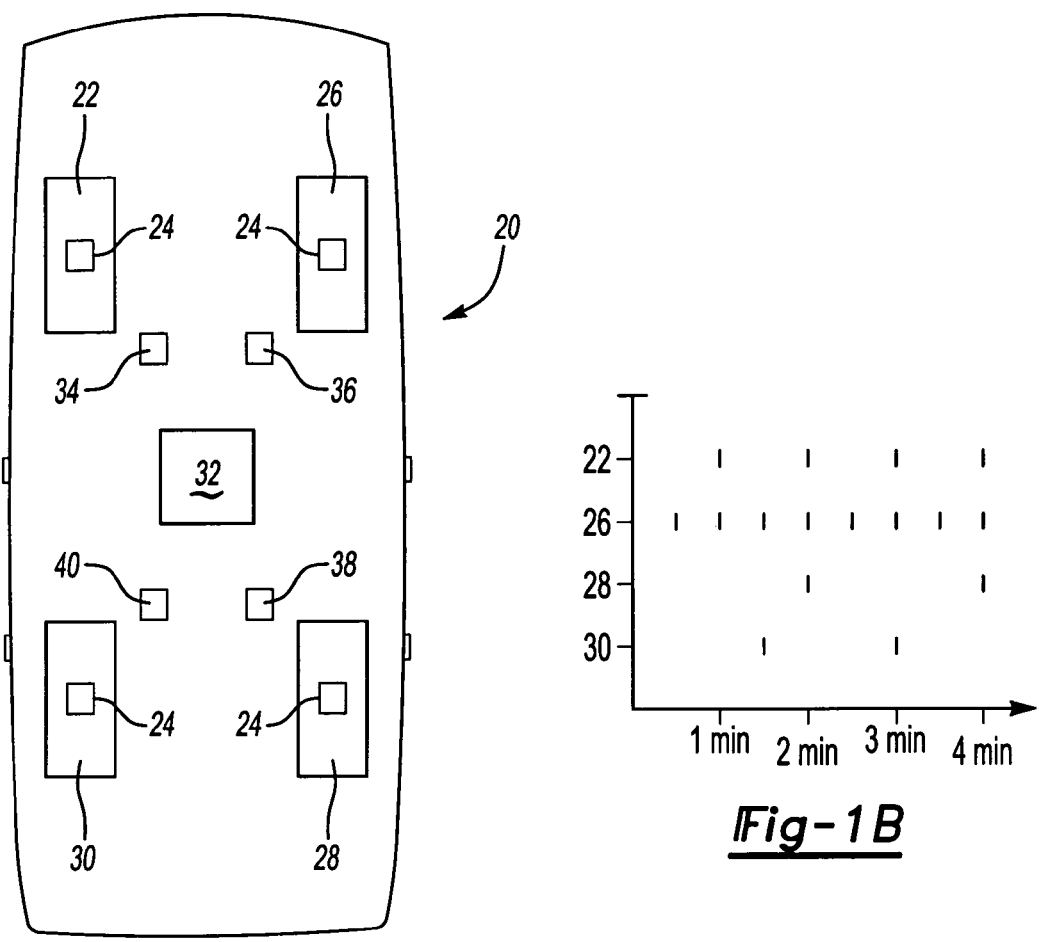
*Fig-1A*
*Fig-1B*
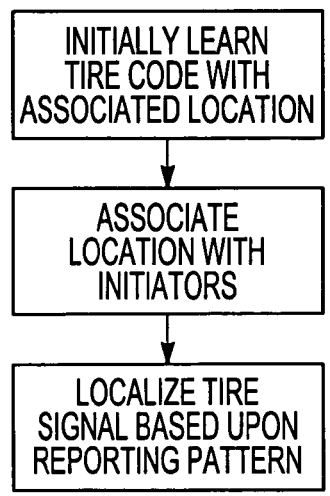
*Fig-2*

ASYNCHRONOUS LOCALIZATION SIGNALS FOR TIRE PRESSURE MONITORING SYSTEM

BACKGROUND OF THE INVENTION

This application relates to a unique method of providing a localization signal to each of the several tire pressure monitoring locations on a vehicle. In particular, the present invention provides localization signals at different time periods for each of the several tires, and which can be associated with a particular location.

Tire pressure monitoring systems are becoming widely utilized in modern vehicles. In a tire pressure monitoring system, a tire pressure sensor is implanted in a vehicle tire. The pressure sensor is sensitive to the air pressure within the tire, and can send a signal should that tire pressure vary from a desired pressure. In one common type of tire pressure sensor, a signal is sent periodically to a central control. The signal includes tire pressure information, and an identifier signal. A control must associate the identifier signal with a particular location, such that a display in the vehicle can report the location of a tire that is experiencing a pressure other than that which is desired.

Various ways of associating the location with the identifier signal, or "localization," are known in the prior art.

One known method of localization involves the use of an LF signal. An LF signal is typically not utilized to send the tire pressure information from the sensor to the control, but is instead only utilized for localization. Thus, it is known to have tire pressure sensors which periodically report on an RF level, but which are also sensitive to be actuated by an LF "ping" or actuation signal to send a signal that is utilized only for localization purposes.

Once the tire location is known, it is stored in a control, however, various real world aspects such as tire rotation or replacement must make the system able to be updated for new locations. One type of LF localization system uses a handheld device that is brought to each of the tires on the vehicle each time the tires are changed or rotated. This is somewhat undesirable in that a worker associated with the location where the tires are moved must remember to do the localization.

Permanent LF initiators have also been proposed. These can be of two types. A first type has a central LF initiator location that sends out a signal, and some directional algorithm may be utilized to determine the location of the responding signal. With such a system, the strength of the "ping" is undesirably high.

Alternatively, it has also been proposed to have LF initiators associated with each of the tires, and have each of the LF initiators include a receiver that connects into the vehicle data bus. However, it is somewhat undesirable to have the vehicle data bus need to communicate with each of the four tire locations.

Thus, a need exists in the prior art for a system that may be easily utilized to provide localization signals.

SUMMARY OF THE INVENTION

In a disclosed embodiment of this invention, a tire pressure monitoring system includes a tire pressure sensor associated with each of the four tires on a vehicle. Each of the sensors is responsive to send a tire pressure signal periodically. Further, each of the sensors is responsive to a "ping" from a localization initiator to send a signal upon receipt of an initialization signal from the localization initiator. In a preferred embodiment, the localization initiator sends an LF signal. The LF signals from each of the four tire locations are distinct, such that a central control that receives the responding signal from the sensors can associate the particular responding signals with a particular location on the vehicle.

In a preferred embodiment, when the vehicle is initially manufactured, the four original tires are each caused to send a localization signal to a central control. Thus, the central control can associate each of the identifiers in each of the tire pressure sensors with a particular tire location. With initial operation, the LF localization initiators are also associated with each of the four tire locations. These localization initiators send an initiation signal to each of the tires periodically during operation of the vehicle. The "period" of each of the four localization initiators is distinct. The control is able to identify the particular pattern for each of the LF localization initiators during the initial operation of the vehicle since it already knows the initial position of each of the reporting tires. Thus, since the control knows the identifier signal of the left front tire, it can then determine the reporting pattern of the left front localization initiator by looking at the reporting pattern of that particular signal. Once this is known, the reporting pattern may be permanently stored, as it will not change unless the localization initiator is changed. The localization initiator is not part of the tire and need not be changed or moved, unless it fails.

In this way, during normal operation, a localization initiator may be associated with each of the vehicle tire locations. This will allow the tire pressure monitoring system to localize the location of the tire without the need for a single large signal from an initiator. Further, there is no need for the vehicle data bus to communicate with each of the initiators, as the single central control can simply receive the signal from each of the tires and identify the particular location.

These and other features of the present invention can be best understood from the following specification and drawings, the following of which is a brief description.

BRIEF DESCRIPTION OF THE DRAWINGS

FIG. 1A is a schematic view of the present invention.
FIG. 1B shows one example of the reporting patterns of the four tires.
FIG. 2 is a flowchart of the present invention.

DETAILED DESCRIPTION OF THE PREFERRED EMBODIMENT

A vehicle 20 is illustrated in FIG. 1A having a tire 22 with a tire pressure monitor sensor 24. Tires 26, 28 and 30 each have a sensor 24. Each of the sensors may be as known in the art, and are capable of sending an RF signal reporting on tire pressure at a predetermined reporting period. Further, each of the sensors 24 is preferably of the type that may also be actuated by an LF initiation signal to send a report to a control 32 that includes an identifier code. The identifier code for each of the sensors 24 is unique to the particular sensor, and is also carried with the normal reporting signal. Thus, the control 32 needs to associate the particular identifier code with a particular location of the vehicle, such that should a faulty pressure signal ever be received, the control can associate the faulty pressure signal with a particular location and report to the vehicle operator.

LF localization initiators 34, 36, 38 and 40 are associated with the tires 22, 26, 28 and 30, respectively. Each of the LF localization initiators are capable of sending a "ping" or initiation signal to each of its respective tires, and cause the creation of a reporting signal back to the control 32.

The present invention utilizes unique reporting patterns from each of the LF initiators 34, 36, 38 and 40 such as shown in FIG. 1B. As shown in FIG. 1B, and merely as an example, the tire 22 may be associated with the LF initiator 34 which has a ping every one minute. Thus, a responsive signal is sent from the sensor 24 associated with the tire 22 every one minute. Again, each signal includes the identifier code so that the control can associate the sensor identifier code with the reporting pattern, and thus the location. The tire 26 is associated with the initiator 36 that has a reporting signal on the order of every half minute. The tire 28 is associated with the initiator 38 that has a reporting signal every two minutes. The tire 30 is associated with the LF initiator 40 that has a reporting period of every 1.5 minutes. As can be appreciated from FIG. 2, during an initiation or localization period, the control 32 will be able to associate the reporting signals from each of the sensors 24 with a particular location 22, 26, 28 and 30, due to the time period. While set time periods are shown in FIG. 1B, it should be understood that these time periods need not be in any particular order, but may be random, pseudo-random or any other difference. In fact, the time periods shown in FIG. 1B are actually overly simplified. It would be more preferable that each of the initiators across each of the vehicle lines has a unique reporting period that is distinct. It is this unique reporting period that will allow the control 32 to associate the reporting signal with a particular location.

Thus, to be practical, there will not be half minute differences between the different reporting periods. It is preferable not to require an assembly line worker to place a particular initiator in any particular location, and thus having a distinct reporting time for each of the potentially millions of initiators which may be manufactured may become preferable. A worker in this art would thus recognize that the reporting periods shown in FIG. 1B could be an oversimplification, and some resolution at the control 32 to be able to identify differences in seconds, and even differences in less than a second would be desirable.

FIG. 2 shows the overall flow chart of this invention. In an initial step, once the vehicle is assembled, a control 32 learns the location and code signal of each of the sensors 24 associated with the tires 22, 26, 28 and 30. It is known in the art that such an initial localization is easily generated by some factory equipment. Once the control 32 knows the location of each of the sensors 24, and can associate its code, the vehicle then moves into the next step of associating each of the locations 22, 26, 28 and 30 with its respective initiators 34, 36, 38 and 40. In particular, the initiators may be set to report periodically over, for example, the first five minutes after start-up of the vehicle each time the vehicle has stopped for a predetermined period of time. Thus, the first time the vehicle is driven, each of the initiators 34, 36, 38 and 40 periodically send a ping to a respective tire sensor 24 to cause a reporting signal. The control 32 receives those reporting signals and can associate the particular time period with a particular location since it already knows the particular location of each of the unique codes for the tires 22, 26, 28 and 30 in their initial position. Once this initial position of the initiators 34, 36, 38 and 40 is known, these may be locked in memory, unless an initiator is ever replaced for having failed Now, each time the vehicle is started, the tire locations are re-localized based upon the reporting frequency of each of the tires 22, 26, 28 and 30. That is, should a tire be replaced, it will be associated with the particular location based upon its reporting frequency which has previously been stored in memory.

In this way, the present invention does not require that any particular localization member be associated on the factory floor with any particular location. Instead, the system will simply read and learn the particular reporting period frequency for each of the initiators.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A tire pressure monitoring system comprising:
 a plurality of tires each including a tire pressure sensor operable to send a tire pressure signal including a code;
 an initiation member associated with each of said tires, said initiation member being operable to send an initiation signal to its respective tire pressure sensor causing said respective tire pressure sensor to send a response signal, each of said initiators having a unique frequency of sending out said initiation signal; and
 a control for receiving said response signals and identifying a particular location on a vehicle based upon a frequency of said response signals.

2. A system as set forth in claim 1, wherein each of said initiators sends an LF signal to each of said tire pressure sensors.

3. A system as set forth in claim 1, wherein each of said tire pressure sensors periodically report on the tire pressure on an RF wavelength, and each of said initiators ping said tire pressure sensors on an LF wavelength.

4. A system as set forth in claim 1, wherein each of said initiators have a unique time period for initiating a response localization signal.

5. A method of associating a location of a particular reporting sensor on a vehicle comprising the steps of:
 (1) providing a plurality of tires on a vehicle, and providing each of said tires with a sensor for sending a tire pressure sensor signal along with a code;
 (2) providing an initiation member associated with each of said tires, said initiation member being operable to send an initiation signal to its respective sensor and causing said respective sensor to send a responsive localization signal, each of said initiation members being operable to send an initiation signal on a unique frequency such that each of said responsive localization signals will have its own unique frequency; and
 (3) receiving said responsive localization signals from each of said tires, and determining a location for each of said responsive localization signals based upon a frequency of said responsive localization signals.

6. A method as set forth in claim 5, wherein a location of each of said tire codes is initially learned at a factory, and a location of each of said frequencies is then learned based upon the reporting frequency of each of said learned codes, and once said tires are moved or rotated, said reporting frequency is utilized to localize the tires subsequently.

* * * * *